United States Patent
Solow

(10) Patent No.: US 6,489,885 B2
(45) Date of Patent: Dec. 3, 2002

(54) DIGITAL HORN FOR A MOTOR VEHICLE

(75) Inventor: Joseph Solow, Dix Hills, NY (US)

(73) Assignee: Wolo Manufacturing Corp., Deer Park, NY (US)

( * ) Notice: Subject to any disclaimer, the term of this patent is extended or adjusted under 35 U.S.C. 154(b) by 0 days.

(21) Appl. No.: 09/798,569

(22) Filed: Mar. 2, 2001

(65) Prior Publication Data

US 2002/0121965 A1 Sep. 5, 2002

(51) Int. Cl.[7] .................................................. G08B 3/10
(52) U.S. Cl. ............................. 340/384.3; 340/384.7; 381/61; 369/21; 369/31
(58) Field of Search ........................... 340/384.7, 384.3; 381/61; 369/21, 31

(56) References Cited

U.S. PATENT DOCUMENTS

| 4,176,518 A | * | 12/1979 | Kawakami et al. ...... 340/384.7 |
| 5,754,094 A | * | 5/1998 | Frushour ................. 340/384.7 |
| 5,774,040 A | * | 6/1998 | Lastoria .................... 340/384.7 |
| 5,986,540 A | * | 11/1999 | Nakagaki et al. ........ 340/384.7 |
| 6,230,140 B1 | * | 5/2001 | Severson et al. ........... 704/278 |

* cited by examiner

*Primary Examiner*—Daniel J. Wu
(74) *Attorney, Agent, or Firm*—Baker Botts L.L.P.

(57) ABSTRACT

A vehicle horn has data representing audio horn signals recorded in a memory. The horn includes a digital counter responsive to clock signals from an oscillator to sequentially read the horn audio data from the memory, provide the data to a D/A converter and the output audio signal to a speaker for broadcast.

6 Claims, 1 Drawing Sheet

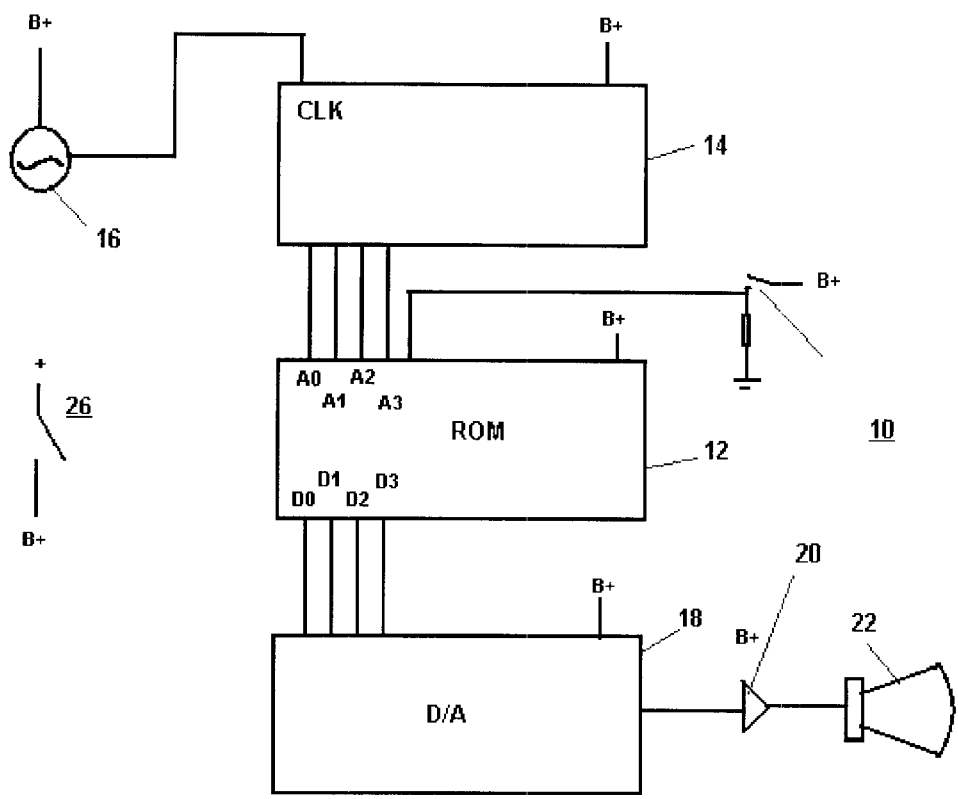

DIGITAL HORN FOR A MOTOR VEHICLE

BACKGROUND OF THE INVENTION

This invention relates to horns for motor vehicles. Such horns conventionally include air horns, such as used on large trucks, which require a compressor and an air-operated horn. Other vehicles have electronically operated horns, which include a diaphragm that is subjected to an intermittent magnetic field to cause the diaphragm to vibrate producing a horn sound.

In most vehicles electrically operated horns fail from time to time and can be easily replaced when failure occurs. However, in vehicles used in certain environments, such as factories, warehouses, docks, mines, etc., safety regulations for operation may require frequent sounding of the vehicle horn. In such applications, the vehicle horn is subjected to more frequent use and failures occur more often than in vehicles used on the road. Further, a horn failure requires that the vehicle be taken out of operation for safety reasons.

It is an object of the present invention to provide a vehicles horn, wherein sound is generated electronically with components that have increased reliability.

SUMMARY OF THE INVENTION

In accordance with the present invention there is provided a horn for a motor vehicle having a read only memory with a memory space substantially filled with digital data representing a digitized horn sound. The memory is addressed by count signals from an N-bit counter which counts to its maximum count value in response to clock signals and thereafter repeats the count signals. The clock signals are provided by an oscillator. Data read from the memory in response to the count signals is provided to a digital-to-analog (D/A) converter which provides audio horn tone signals which are supplied to a speaker.

In one embodiment the memory may include first and second memory spaces, each substantially filled with data representing respective first and second horn sounds. At least one fixed address signal is selectable to select the desired horn sound.

In a preferred arrangement there is provided an amplifier for amplifying the audio signal.

According to the invention there is provided a method for providing a horn sound for a motor vehicle. Data representing a horn audio signal is recorded to substantially fill a contiguous addressable space of a digital memory. A continuous and repeating sequence of digital count signals are provided as address signals to the memory to continuously and repeatedly read out the data signals, which are converted to audio signals and broadcast by a speaker.

Preferably, a segment of the memory which includes all values of N address bits is substantially filled with the horn audio data.

For a better understanding of the present invention, together with other and further objects, reference is made to the following description, taken in conjunction with the accompanying drawings, and its scope will be pointed out in the appended claims.

BRIEF DESCRIPTION OF THE DRAWING

The drawing is a schematic diagram of a circuit for a horn in accordance with a preferred embodiment of the present invention.

DETAILED DESCRIPTION OF THE INVENTION

Prior art horns for motor vehicles typically rely on mechanical vibrations, produced, for example by a vibrating diaphragm. The horn sounds thus produced have become familiar, and accordingly their effect, for example, in alerting pedestrians and operators of other vehicles cannot easily be replicated electronically by a simple audio tone signal.

The present invention uses an actual horn sound, which is digitally recorded in a memory. The data representing the complex horn sound is recorded at sequential memory addresses, which can be addressed by a continuously running counter to cycle through the recorded memory space. If a horn is activated for a sufficiently long period of time, the counter continues running and the read-out repeatedly cycles through the assigned memory space. Unlike other memory read-out systems, there is no concern for where the count starts or ends. Thus there is no need to reset the counter to a particular count since there is no concern for what portion of the horn sound is initialed at the start of the readout. If the counter "over flows", it merely starts the count over and repeats reading the same memory space.

Referring to the drawing a read-only-memory 12, which may be an electrically or mask programmed memory, is provided with a memory space having a sequence of addresses which comprise all values of N-bit digital number. For example, if the memory is a 256 by 8-bit memory, the 256 address values correspond to all values of an 8-bit number. At each address space data is recorded representing the instantaneous amplitude of an audio signal representing a horn sound, such as an 8-bit data value. Accordingly, if the 256 memory addresses are read at a rate corresponding to the sampling rate at which the horn sound was sampled for recording, digital values representing the horn sound amplitude can be read and converted to an analog signal in A/D converter 18 for broadcast by a speaker 22.

Since a horn sound is fundamentally repetitive, it can be replicated by reading out the memory space repeatedly. The beginning and end addresses are of no consequence, so not initialization is required.

In one arrangement the memory is completely filled and addressed by a counter 12 which sequentially counts through all values of the N address bits. In an alternate arrangement it is possible to use less than all available addresses to store the horn sound data, for example in a 512 address memory having 9 address bits, one bit may be "fixed" to one or zero, and an eight bit counter 14 may supply address signals to the other eight address bits. Likewise using a larger memory, other address bits may be fixed. The "fixed" address bits may also be selectable, e.g. by a manual switch, to select a different continuous memory space having a different horn sound recorded thereon. A switch 24 can be provided to manually fix one memory space or the other.

In one arrangement a counter 14 provides a sequence of contiguous addresses to memory 12 in response to clock signals from oscillator 16. If the clock signals are at the rate the horn signal was sampled for the horn data recorded in memory 12, the least significant bits of the counter are used as address signals. Alternatively, the oscillator may run at a higher frequency, and other appropriate sequential bits of the counter can be used as address signals. Since the horn sound is continuous and repetitive, there is no concern with the value at which counter 14 is started.

In a preferred arrangement the horn audio signals are sampled into 5ASPM bit values at a sampling rate of 44 kHz and recorded into a memory, consisting of a sample of horn sounds over a 40 sec period.

In a preferred arrangement the digital data read from memory 12 is provided to D/A converter 18, and the output audio horn signal is amplified in amplifier 20 and provided to speaker 22. The arrangement can be entirely solid-state, has no mechanical parts or relays subject to wear, and consequently has high reliability, even with frequent use.

A switch 26 to activate the horn applies batter power (B+) to all components to activate the horn. Alternately, the parts may be activated by connection to ground.

In addition to high reliability, the horn of the present invention is believed to consume less power, and require no high-current relay as used in diaphragm horns. This factor is important in battery operated vehicles, such as forklifts, that may require frequent horn use.

While there has been described what are believed to be the preferred embodiment of the invention, those skilled in the art will recognize that other changes and modifications may be made thereto without departing from the spirit of the invention, and it is intended to claim all such changes and modification as fall with the true scope of the invention.

What is claimed is:

1. A horn for a motor vehicle, comprising:

an N-bit counter responsive to clock signals to advance N-bit count signals to the maximum count value and thereafter repeat said count signals;

a read only memory having memory space having addresses corresponding to said N-bit count signals and optionally other fixed address signals, substantially filled with digital data representing a digitized horn sound;

an oscillator for providing clock signals to said counter;

a digital-to-analog converter responsive to data signals read from said read only memory to provide audio horn tone signals in response thereto;

a speaker responsive to said audio horn tone signals; and a switch for applying power to actuate said horn.

2. A horn as specified in claim 1 wherein read only memory has first memory space corresponding to said N-bit count and a first value of at least one other fixed address signal, said first memory space being filled with digital data representing a first digitized horn sound and a second memory space corresponding to said N-bit count and a second value of said at least one other fixed address signal, said second memory space being filled with digital data representing a second digitized horn sound, and wherein said at least one other fixed address signal is selectable to select said first or second horn sound.

3. A horn as specified in claim 1 further comprising an amplifier responsive to said audio horn tone signal from said digital-to-analog converter for providing an amplified audio horn tone signal to said speaker.

4. A method for providing a horn tone for a motor vehicle, comprising:

recording data representing a horn audio signal to substantially fill a contiguous addressable segment of a digital memory;

providing a continuous and repeating sequence of digital count signals as address signals to said memory to continuously and repeatedly read said data from said memory;

converting said data signals to audio signals; and providing said audio signals for sound broadcast by a speaker.

5. A method as specified in claim 4, wherein said recording comprises substantially filling a segment of said memory having N address bits and including all values of said N address bits.

6. A method as specified in claim 4 further comprising amplifying said audio signals prior to providing said audio signals to said speaker.

* * * * *